United States Patent [19]

Kerlidou

[11] Patent Number: 4,651,396
[45] Date of Patent: Mar. 24, 1987

[54] DEVICE FOR FITTING VALVES INTO THE CYLINDER HEAD OF AN INTERNAL COMBUSTION ENGINE

[75] Inventor: Michel Kerlidou, La Falaise Aubergenville, France

[73] Assignees: Automobiles Peugeot, Paris; Automobiles Citroen, Seine, both of France

[21] Appl. No.: 730,325

[22] Filed: May 3, 1985

[30] Foreign Application Priority Data

May 10, 1984 [FR] France ................... 84 07532

[51] Int. Cl.[4] .................................. B23P 19/04
[52] U.S. Cl. ........................... 29/213 R; 294/64.1
[58] Field of Search .............. 29/213 R; 294/64.1; 901/40; 269/21

[56] References Cited

U.S. PATENT DOCUMENTS 3,230,002  1/1966  Olson ........................... 294/65.1
3,898,726  8/1975  Godart et al. ................. 29/213 R
4,078,671  3/1978  Lundström .................. 294/64.1 X

FOREIGN PATENT DOCUMENTS 476962  2/1976  U.S.S.R. ..................... 29/213 R

Primary Examiner—Roscoe V. Parker
Assistant Examiner—Steven P. Schad
Attorney, Agent, or Firm—Karl F. Ross; Herbert Dubno

[57] ABSTRACT

A device for fitting valves into the cylinder head of an internal combustion engine by means of a manipulator robot which ensures extraction from their support of a series of valves and the automatic and simultaneous introduction thereof into their respective vertically disposed guides in the cylinder head. The device comprises means for generating a vacuum in the valve guides during introduction of the valves and an assembly of gripping apparatus which are fixed to the same support and each assigned to one of the valves; each gripping apparatus comprises a first portion fixed to the support, a second gripping portion connected by resilient bellows to the first portion and cooperative structure which may be made inoperative for centering the two portions of the apparatus with respect to each other.

2 Claims, 8 Drawing Figures

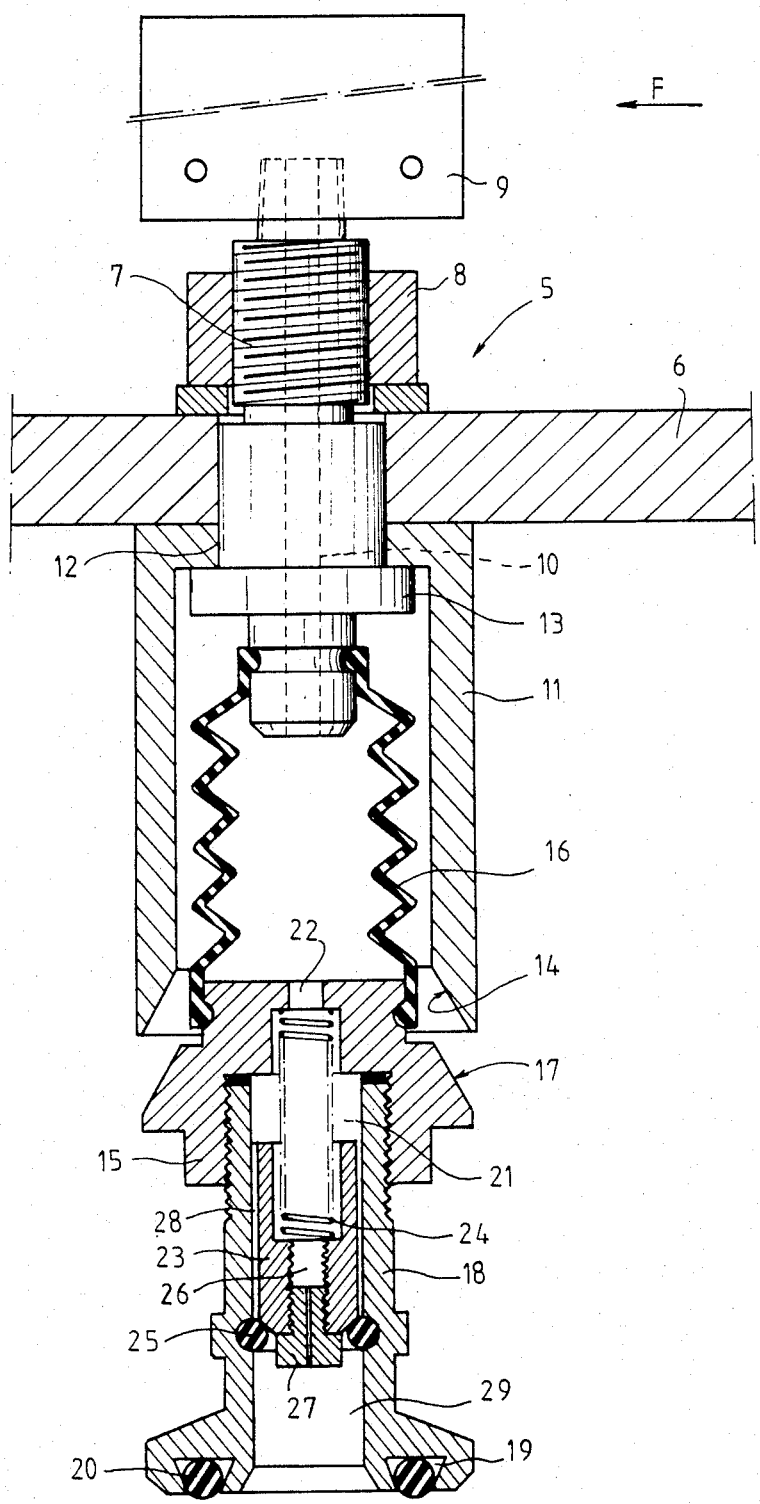

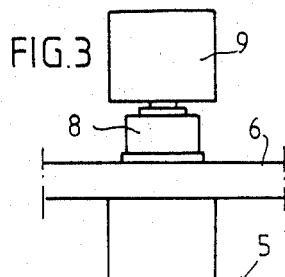
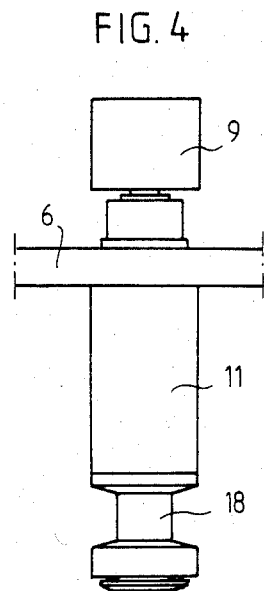
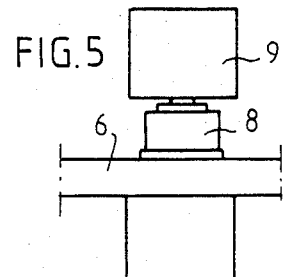
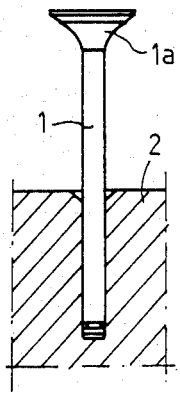
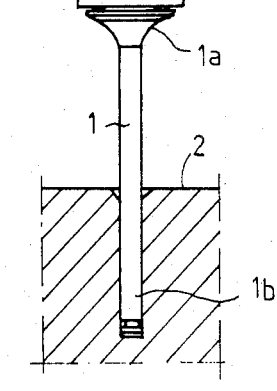
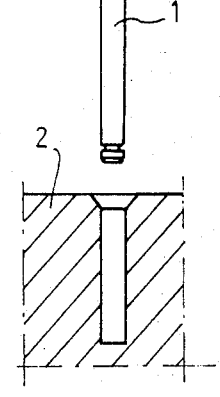
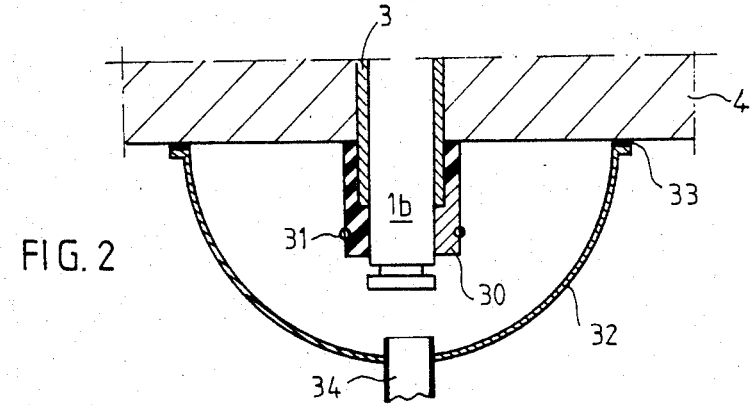

DEVICE FOR FITTING VALVES INTO THE CYLINDER HEAD OF AN INTERNAL COMBUSTION ENGINE

BACKGROUND OF THE INVENTION

The present invention relates to a device for fitting valves into the cylinder head of an internal combustion engine, which may be mounted on an engine assembly transfer chain in which all the work stations are automated. A device of this kind cooperates, in this case, with a handling robot adapted for automatically and simultaneously introducing a plurality of valves into a series of guides provided in the cylinder head and disposed vertically.

The valve stems have a clearance of a few hundredths of a millimeter with respect to their guide. The guide has at its end a chamfer of a few tenths of a millimeter. If it is desired to effect the introduction operation using a robot, for centering to be possible the robot must present each valve stem inside the chamfer of the guide; for the robot that represents a coordinate accuracy difficult to achieve.

Moreover, if the robot presents a valve stem which is offset with respect to its guide, buckling of the stem may be caused while it is being introduced into the cylinder head with a mark on the cylinder head.

The aim of the present invention is to provide a device for fitting valves into the cylinder head of an internal combustion engine using a manipulator robot, which provides extraction from their support of a series of valves and the automatic and simultaneous introduction thereof into their respective vertically disposed guides in the cylinder head, even when the coordinate error of the robot is greater than the radius of the valve stem.

SUMMARY OF THE INVENTION

This device comprises means for generating a vacuum in the valve guides during introduction of the valves, and an assembly of gripping apparatus which are fixed to the same support and each assigned to one of the valves, and each gripping apparatus comprises a first part fixed to the support, a second gripping part connected by resilient means to the first part and means which may be made inoperative for centering the two parts of the apparatus with respect to each other.

For using this device, the two parts of each gripping apparatus are first of all centered and a series of valves is picked up. The device is brought straight above the cylinder head and the valves are brought vertically close to their guides. Then the guides are placed under vacuum and the centering means are made inoperative. Each of the valves is then centered in its guide under the effect of the vacuum; it only remains to free, from the gripping apparatus, the valves which are fitted into their respective guides.

In one embodiment of the invention, the gripping part of the gripping apparatus is connected to the first part of this apparatus by a resilient bellows which may be connected to a vacuum source, and has at its upper part a truncated cone shaped bearing surface which may be applied to a truncated cone shaped bearing surface provided at the lower part of said first part.

For centering the two parts of the gripping apparatus with respect to each other, it is sufficient to create a vacuum in the bellows. The gripping part rises under the effect of the vacuum generated in this bellows and the two truncated cone shaped bearing surfaces are applied one against the other while ensuring the centering. When the suction is then turned off, the two truncated cone shaped bearing surfaces move away from each other, which allows the valve to be suitably orientated and to be engaged in its guide.

The gripping part may comprise a central bore which communicates with the bellows. The valve is thus automatically gripped when this gripping part is applied on the valve and the bellows is communicated with a vacuum source.

So that the gripping element may continue to hold the valve when the suction in the bellows is turned off, so that the valve may be orientated, the central bore of the gripping part may comprise, at a position distant from its lower end, a clapper valve subjected to the action of a spring and controlled by the vacuum in the bellows. This clapper opens when the clapper is placed under vacuum, which allows the vacuum to act on the valve head so as to hold it in position. When the suction in the bellows is cut off, the clapper closes under the action of its spring. But the part of the bore which is downstream of the clapper remains under a vacuum and the valve remains held in position.

The clapper may comprise a nozzle placing the part of the bore situated downstream of this clapper is communication with the part located upstream thereof. When the clapper is closed, vacuum in the part of the bore which is downstream of this clapper reduces progressively so that the valve is automatically freed at the end of a given time, which allows it to fit into its guide, after centering thereof.

BRIEF DESCRIPTION OF THE DRAWINGS

One embodiment of the device of the invention will be described hereafter by way of non limitative example with reference to the accompanying drawings in which:

FIG. 1 is an axial sectional view of the gripping apparatus;

FIG. 2 is a section showing a valve stem in its guide and means for generating a vacuum in this guide;

FIGS. 3 to 8 are elevational views of the gripping apparatus, at different steps in positioning the valve.

SPECIFIC DESCRIPTION

Figure 6:
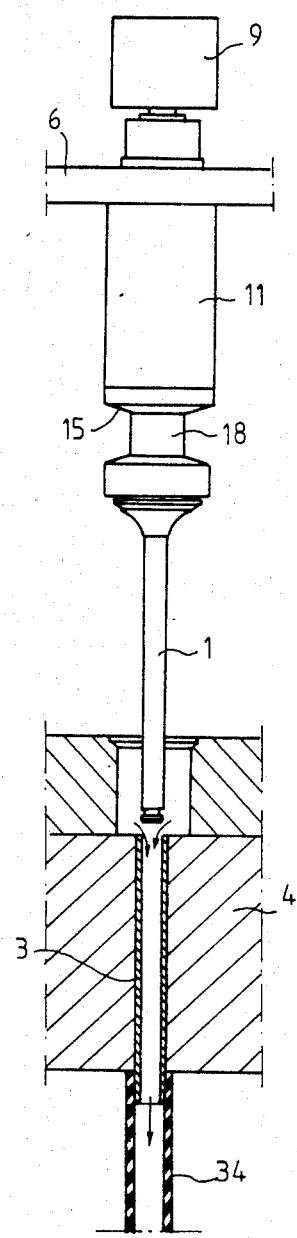

Such as it is shown in the drawings, the assembly device of the invention is intended to extract valves 1 disposed in a support 2 in the form of a rack and introduce them simultaneously into guides 3 of the cylinder head 4 (see FIG. 6).

For each valve to be introduced, the device comprises a gripping apparatus designated generally in the drawings by the reference 5, the assembly of the gripping apparatus being mounted on the same support 6.

Each of the gripping apparatus comprises a venturi holder 7 which is fixed to support 6 by a nut 8 and holds a venturi 9. This latter is connected to a pressurized air source shown schematically by the arrow F; at its neck opens an axial duct 10 of the venturi holder 7, a vacuum being thus generated in this duct when the venturi is fed with compressed air.

A centering means 11 in the form of a vertically disposed tube closed at its upper part is disposed coaxially to the venturi holder 7. Its top is pierced with a hole 12 for the passage of venturi holder and it is held in position on support 6 by collar 13 of this venturi holder. The lower part is given the shape of a truncated cone 14 widening out towards the outside.

A centered body 15 is suspended from the venturi holder 7 by a bellows 16 into which emerges duct 10, each of the ends of this bellows being sealingly fixed respectively to the centered body and to the venturi holder. The upper face 17 of this centered body has the form of a truncated cone supplementary to the truncated cone 14.

Into the centered body 15 is screwed a gripping element 18 whose lower face has approximately the shape and the dimensions of the head 1a of valve 1. This lower face has a groove 19 in which is housed an O-seal 20.

The gripping element 18 comprises an axial bore 21 which communicates with the inside of bellows 16 through a bore 22 in the centered body 15. Thus, when the venturi 9 is fed and a vacuum is generated in duct 10, this vacuum, which is transmitted by the bellows, is also exerted at the lower part of the gripping element 18 and holds the valve 1 on the head 1a of which the seal 20 has been applied.

A clapper valve 23 is mounted for sliding in the bore 21 of the gripping element 18. A spring 24 which bears on the centered body 15, tends to hold the clapper in abutment against an annular seal 25 provided at the surface of bore 21, at a certain distance from the lower end thereof. This clapper 23 comprises an axial bore 26 into which is screwed a nozzle 27. It further has at its periphery longitudinal grooves 28 which allow the vacuum to be exerted at the lower part of the gripping element, when it is not applied against its seal 25. The lower part of bore 21, under the nozzle 27, forms a chamber 29.

As can be seen in FIG. 2, each of the guides 3 of the cylinder head 4 projects outwardly from this cylinder head and a sleeve 30 is fitted over the projecting end of the guide. The length of the sleeve is greater than that of this projecting end and the sleeve has a keeper ring 31 in its part external to said projecting end. Thus, when valve 1 has been positioned in the cylinder head and when its stem 1b passes through the sleeve 30, it is imprisoned in the cylinder head.

Around the sleeve 30 may be applied the casing 32, controlled by a hydraulic cylinder not shown, having a seal 33 and being connected to a suction source by a pipe 34.

The operation of the device which has just been described is as follows:

At rest, each of the gripping apparatus is in the position shown in FIG. 1, in which valve 23 is applied to its seat 25, the two truncated cone shaped surfaces 14 and 17 being spaced apart from each other.

The assembly device is then brought above the rack 2 so that each of the apparatus 5 is straight above a valve 1. The venturis 9 are then operated (FIG. 3). Under the effect of the vacuum, the bellows 16 contracts and the surface 17 of body 15 is applied to the surface 14 of the centering means 11, which centers this body 15. At the same time, the clapper valve 23 rises against compressing spring 24, the grooves 28 having sufficiently small dimensions for the pressure drop created to overcome the action of spring 24.

Then the gripping apparatus 5 is brought by the robot to the vicinity of head 1a of the valve which is thus gripped by suction (FIG. 4).

Figure 7:
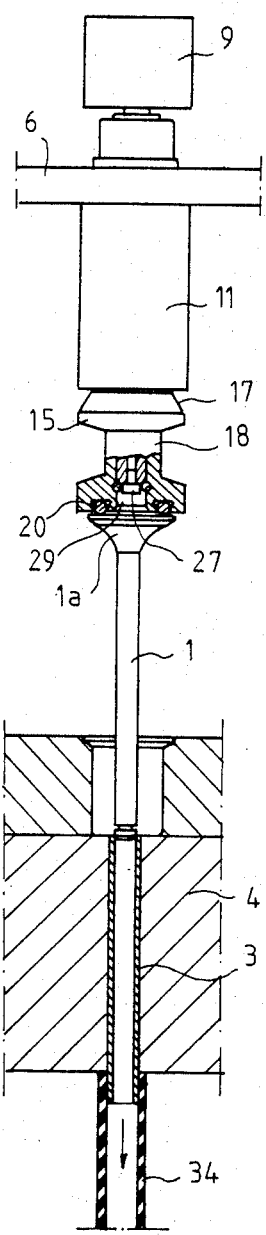

The valve is removed from its support 2 (FIG. 5) and is brought in the vicinity of guide 3, substantially in its axis, the casing 32 having been applied to the cylinder head about sleeve 30 and pipe 34 having been previously connected to the vacuum source (FIG. 6). Then the air supply to the venturi 9 is cut off. The centered body 15 comes loose from the centering means 11, which gives a freedom of movement to the suspended valve 1, the elastic bellows 16 permitting both orientation of this valve and a certain axial movement thereof. At the same time, spring 24 applies valve 23 against its seat 25, which results in maintaining the vacuum in chamber 29 (FIG. 7). The valve is orientated with respect to the guide and comes into a position for introduction there into.

Figure 8:
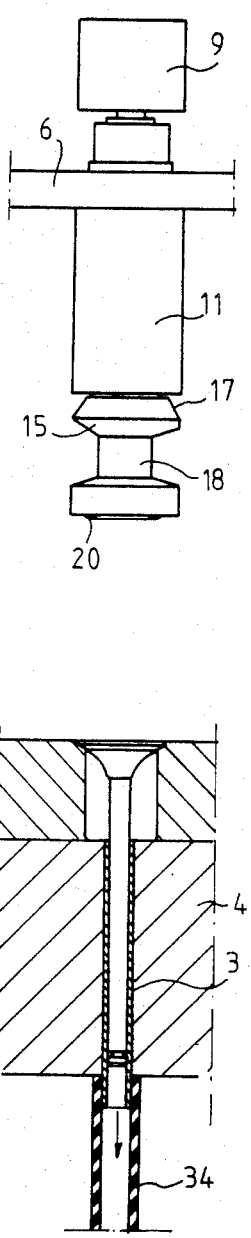

Then, with the vacuum dropping slowly in chamber 29 because of nozzle 26, the valve is separated from the gripping element 18 and is sucked by the guide 3 (FIG. 8). At the end of its travel, it is held imprisoned by the sleeve 30.

It goes without saying that the present invention is not to be considered as limited to the embodiment described and shown but covers, on the contrary, all variants thereof.

I claim:

1. A device for fitting valves into a cylinder head of an internal combustion engine by means of a manipulator robot which provides extraction from a support of a series of valves and the automatic and simultaneous introduction thereof into a set of respective vertically disposed guides in the cylinder head, which device further comprises means for generating a vacuum in the valve guides during introduction of the valves and an assembly of gripping apparatus which are fixed to the same support and each assigned to one of the valves, each gripping apparatus comprising a first part fixed to said support, a second gripping part connected by an elastic bellows which may be connected to a vacuum source and has at an upper part a truncated cone shaped bearing surface which may be applied to a truncated cone shaped bearing surface provided on a lower portion of said first part, said gripping part further comprising a central bore communicating with said bellows and having at a position distant from a lower end, a clapper valve subject to the action of a spring and controlled by the vacuum in the bellows, said spring holding the clapper valve in abutment against an annular seal in the absence of sufficient vacuum and said clapper valve having longitudinal grooves at its periphery and means which may be made inoperative for centering the two said parts of the apparatus with respect to each other.

2. The device as claimed in claim 1, wherein said clapper valve comprises a nozzle for communicating the portion of said bore which is downstream of said clapper Valve with the portion which is upstream thereof.

* * * * *